(12) United States Patent
Lang et al.

(10) Patent No.: US 6,583,730 B2
(45) Date of Patent: Jun. 24, 2003

(54) SURVEILLANCE APPARATUS FOR A VEHICLE

(75) Inventors: Heinrich Lang, Ergersheim (DE); Michael Witzke, Ansbach (DE)

(73) Assignee: Lang-Mekra North America, LLC, Ridgeway, SC (US)

( * ) Notice: Subject to any disclaimer, the term of this patent is extended or adjusted under 35 U.S.C. 154(b) by 0 days.

(21) Appl. No.: 09/731,575

(22) Filed: Dec. 7, 2000

(65) Prior Publication Data

US 2002/0017983 A1 Feb. 14, 2002

(30) Foreign Application Priority Data

Jul. 28, 2000 (DE) ......................... 100 36 875
Oct. 6, 2000 (DE) ....................... 200 17 165 U (51) Int. Cl.$^7$ ................................. G08G 1/09
(52) U.S. Cl. ..................... 340/905; 340/901; 348/143; 348/148; 348/207.99
(58) Field of Search ............... 340/905, 425.5, 340/426, 461, 901; 348/143, 148, 118, 149, 207.99, 208.14, 231.2, 231.3, 231.5; 359/896, 839, 273

(56) References Cited

U.S. PATENT DOCUMENTS

| | | | |
|---|---|---|---|
| 4,882,565 A | 11/1989 | Gallmeyer | 340/461 |
| 5,289,321 A | 2/1994 | Secor | 359/896 |
| 5,523,811 A | 6/1996 | Wada et al. | 396/429 |
| 5,574,443 A | 11/1996 | Hsieh | 340/901 |
| 5,677,979 A * | 10/1997 | Squicciarini et al. | 386/46 |
| 5,680,123 A * | 10/1997 | Lee | 340/937 |
| 5,793,308 A * | 8/1998 | Rosinski et al. | 340/903 |
| 5,793,420 A | 8/1998 | Schmidt | 348/148 |
| 5,910,854 A | 6/1999 | Varaprasad et al. | 359/273 |
| 5,939,717 A * | 8/1999 | Dunne et al. | 701/117 |
| 5,940,120 A | 8/1999 | Frankhouse et al. | 348/61 |
| 5,978,017 A * | 11/1999 | Tino | 348/148 |
| 6,151,065 A * | 11/2000 | Steed et al. | 348/148 |
| 6,163,338 A * | 12/2000 | Johnson et al. | 348/148 |
| 6,222,447 B1 * | 4/2001 | Schofield et al. | 340/461 |
| 6,259,475 B1 * | 7/2001 | Ramachandran et al. | 348/148 |
| 6,320,612 B1 * | 11/2001 | Young | 348/148 |
| 6,397,137 B1 * | 5/2002 | Alpert et al. | 701/49 |

FOREIGN PATENT DOCUMENTS

| | | |
|---|---|---|
| DE | 19921488 | 11/2000 |
| EP | 1032209 | 8/2000 |
| EP | 1033693 | 9/2000 |
| JP | 58085110 | 5/1983 |
| JP | 62091092 | 4/1987 |
| JP | 62166135 | 7/1987 |
| JP | 04257189 | 9/1992 |
| JP | 05137144 | 6/1993 |
| JP | 09272399 | 10/1997 |
| JP | 10076880 | 3/1998 |
| JP | 2000062532 | 2/2000 |
| JP | 2000128031 | 5/2000 |

OTHER PUBLICATIONS

European Search Report dated Jan. 14, 2002 with Verified English translation.

(List continued on next page.)

Primary Examiner—Toan Pham
(74) Attorney, Agent, or Firm—Dority & Manning, P.A.

(57) ABSTRACT

A surveillance apparatus is provided for a vehicle to record data such as images over a period of time. The surveillance apparatus has a camera for collecting images in a field of view from the vehicle and a storage apparatus to record and store the data. A method of surveilling a vehicle operating area using the surveillance apparatus is also disclosed.

29 Claims, 5 Drawing Sheets

OTHER PUBLICATIONS

English language Abstract of JP 58085110.
English language Abstract of JP 62091092.
English language Abstract of JP 62166135.
English language Abstract of JP 04257189.
English language Abstract of JP 05137144.
English language Abstract of JP 09272399.
English language Abstract of JP 10076880.
English language Abstract of JP 2000062532.
English language Abstract of JP 2000128031.

U.S. Patent Application No. 09/731,574, Dec. 7, 2000, corresponding to German Application No. DE 10036875.1, Jul. 28, 2000.
U.S. Patent Application No. 09304,002, Apr. 30, 1999, corresponding to German Application No. DE 19902486.3, Jan. 22, 1999.
U.S. Patent Application No. 09/303,503, Apr. 30, 1999, corresponding to German Application No. DE 19903595.4, Jan. 29, 1999.
English Language Abstract of DE 19921488, Nov. 16, 2000.

* cited by examiner

SURVEILLANCE APPARATUS FOR A VEHICLE

FIELD OF INVENTION

The invention concerns a surveillance apparatus for motor vehicles, especially commercial vehicles.

BACKGROUND OF THE INVENTION

The so-called "black box" is well known in aviation. Aircraft black boxes record flight data between a specified time in the past and the present, for instance, in the last half hour. Voice recorders are also provided in which the conversation in the cockpit of an airplane is recorded for a specific duration between past and present. So that these data in the case of a crash can be evaluated, the black box is installed in the aircraft in a manner resistance to impact and fire.

OBJECTIVES AND SUMMARY OF THE INVENTION

It is an objective of the present invention to create a surveillance apparatus for motor vehicles, especially for commercial vehicles, similar to that used in aviation.

The achievement of this objective is carried out by the features of the invention.

Images taken by a camera installed in the vehicle in a time interval from a first particular point in time $t_1$ to a second point in time $t_2$ are stored in memory by an image and data memory unit. Images that are older than $t_1$ are routinely erased, i.e., written over.

Alternatively, specific intervals in past time can be stored in addition to the most recent or present interval. By means of the images retained in an image and data bank, the events leading up to and including an accident can be more simply and accurately reconstructed. Accordingly, accident cause or fault can be more easily determined. For example, in a case of driving with an insufficient clearance to the vehicle ahead on an expressway, proof can be provided that the preceding vehicle had cut in leaving too small an interposing clearance.

In accord with a preferred embodiment of the invention, a specified period of time between the present $t_2$ and a past time $t_1$ is recorded and stored automatically, while occurrences that are older than $t_1$ are erased, that is, written over.

Following a further advantageous embodiment of the invention, the camera is installed in one of the outside rearview mirrors. In this way, the side area of the motor vehicle also comes under supervision.

Alternatively to the above, the camera may be placed in the interior of the motor vehicle, optionally in the location of the inner rearview mirror with a forward field of view. When this arrangement is followed and the camera is inside, a weatherproofing encasement of the camera is not necessary.

In accord with yet another advantageous embodiment of the invention an image and data storage bank, besides recording and storing an image, can include the date, temperature and data. By this means, in the event of an accident, the sequences leading up to the accident can be more easily reconstructed and the question of blame more easily solved.

In accord with another advantageous embodiment of the invention, the image and data storage equipment will be fire and impact resistant. In this way, assurance is provided that even in the case of serious accidents in which fire breaks out and the vehicle suffers severe deformation, the stored data will remain preserved for later examination.

In accord with a further preferred embodiment of the invention, a monitor is provided upon which the image taken by the camera can be displayed. In this way, the image quality and the angle of the camera's field of vision can be supervised. Also, the monitor is valuable in the docking and maneuvering of the vehicle.

By means of placement of the monitor in one of the outside rearview mirrors in the field of vision of the driver, especially in the mirror pane, in the case of backing up or maneuvering, it is possible that a simultaneous survey of the field at the rear and the area in front of the vehicle can be obtained from the monitor in one glance.

In accord with yet another advantageous embodiment of the invention, the camera is designed to be pivotable. This allows the camera to pick up various view angles around the vehicle and allow the acquired images to be shown on the monitor. In the case of backing up, again the area behind the vehicle can be viewed in the monitor while in normal forward motion, the area in front of the vehicle is surveyed by the camera.

In accord with another advantageous embodiment of the invention, the field of view of the camera can be altered by an adjustment apparatus in the driver area within the grasp of the driver, so that the driver can bring various areas around the vehicle into view on the monitor.

In accord with another advantageous embodiment of the invention, a plurality of cameras is provided. By this arrangement, a multi-point switching among the various cameras brings different zones about the vehicle into view on the monitor. By this means, the pivoting of a camera can be dispensed with. The respective camera can be placed in the optimum location for the respective area to be viewed. The camera for backing up is logically placed on the rear of the vehicle. In the image and data storage apparatus, the images of the most recent time can be stored as desired from one or more of the cameras.

BRIEF DESCRIPTION OF THE DRAWINGS

Further details, features and advantages of the invention become evident from the following description with the aid of the drawing. There is shown in:

FIG. 2 a schematic presentation of a first advantageous embodiment of the invention, FIG. 3 a partial sectional, side view of a second embodiment with the camera in an outer rearview mirror, FIG. 4 a front view of the outer rearview mirror of the second embodiment with the monitor in the mirror pane, and FIG. 5 a plan view of a third preferred embodiment with a multiplicity of cameras.

DETAILED DESCRIPTION OF THE DRAWINGS

Reference will now be made in detail to the presently preferred embodiments of the present invention, examples of which are illustrated in the drawings. The examples are provided by way of explanation of the invention and are not meant as limitations of the invention. For example, features illustrated or described as part of one embodiment can be used on another embodiment to yield yet a third embodiment. Accordingly, the present invention is intended to include such modifications and variations.

Figure 1:
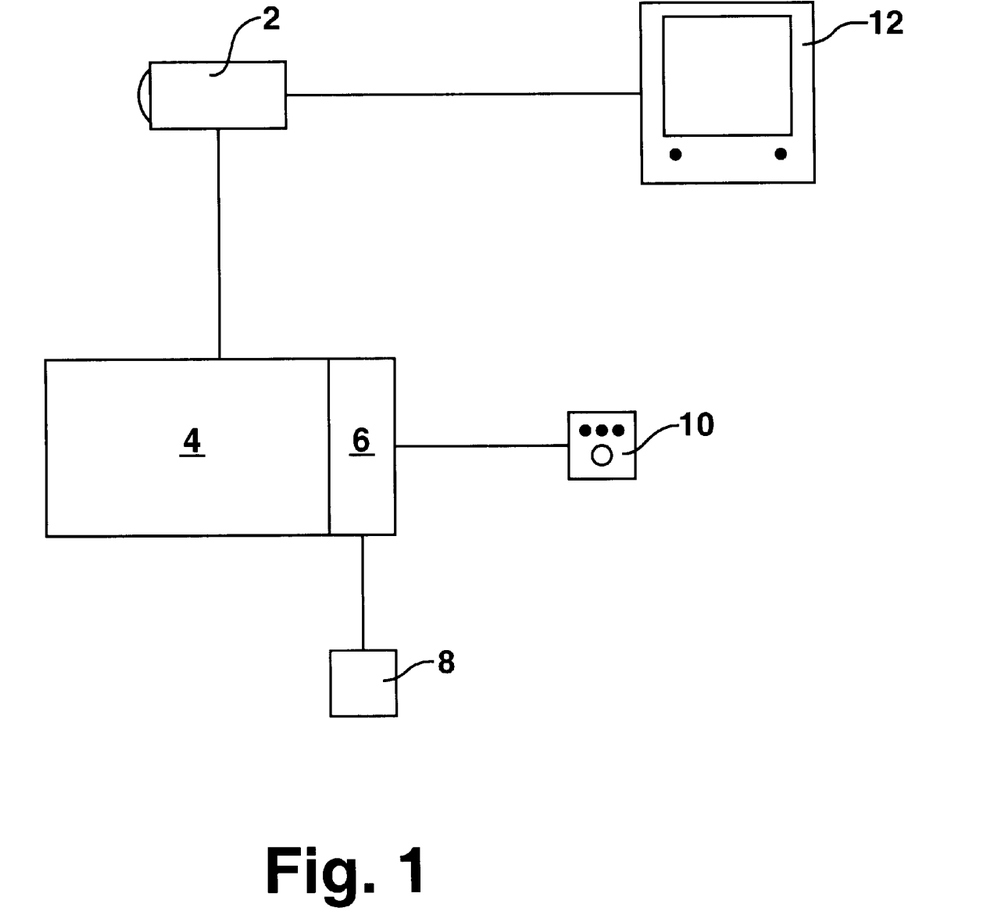
FIG. 1 a schematic presentation of the invention.

FIG. 1 shows schematically the basic structure of the invention with a camera 2, which is connected with an image and data storage unit 4. The image and data storage unit 4 includes a control apparatus 6, which directs the recording of the image/data supplied by the camera. This assures a simple embodiment that, for instance, the last ten minutes are always recorded and stored. By means of an interface device 8, the conditions of travel of the vehicle can be captured, so that the recording can be terminated upon stand still of the vehicle. The interface device 8 also permits other vehicular data to be stored in addition to the image/data. For instance, vehicle drivetrain activity such as speed, acceleration, and use of brakes, as well as temperature, condition of pavement, humidity, date, time of day, and degree of brightness, are picked up by corresponding sensors or from other available equipment in the vehicle.

The camera 2 can be placed in the interior or on the outside of the vehicle and have available a viewing angle in front of, behind, or at the sides of the vehicle or within the vehicle itself. The image and data storage unit 4 with the control apparatus 6, can be placed in an optional, protected part in the vehicle. By means of an operational device 10, the time points $t_1$ and $t_2$ can be set to determine the points in time that the image recording will occur. With the operational device 10 co-acting with control apparatus 6, it is possible even during travel, in addition to the saved last minute time interval, to record and store other time periods in the past. With this advantage, it becomes possible to determine during an expressway trip that an overtaking vehicle has cut in too closely and the assured clear distance between vehicles has been dangerously shortened.

In addition, a monitor 12 can be connected with the camera 2 and/or the image and data storage unit 4. The monitor 12 can display the image taken by the camera 2. With the use of the operational device 10, the direction of view of the camera 2 can be changed in case the camera 2 is installed to be pivoted. Where the camera 2 is concerned, preferably a CCD-camera should be employed and the monitor 12 would preferably have a LCD screen.

Figure 2:
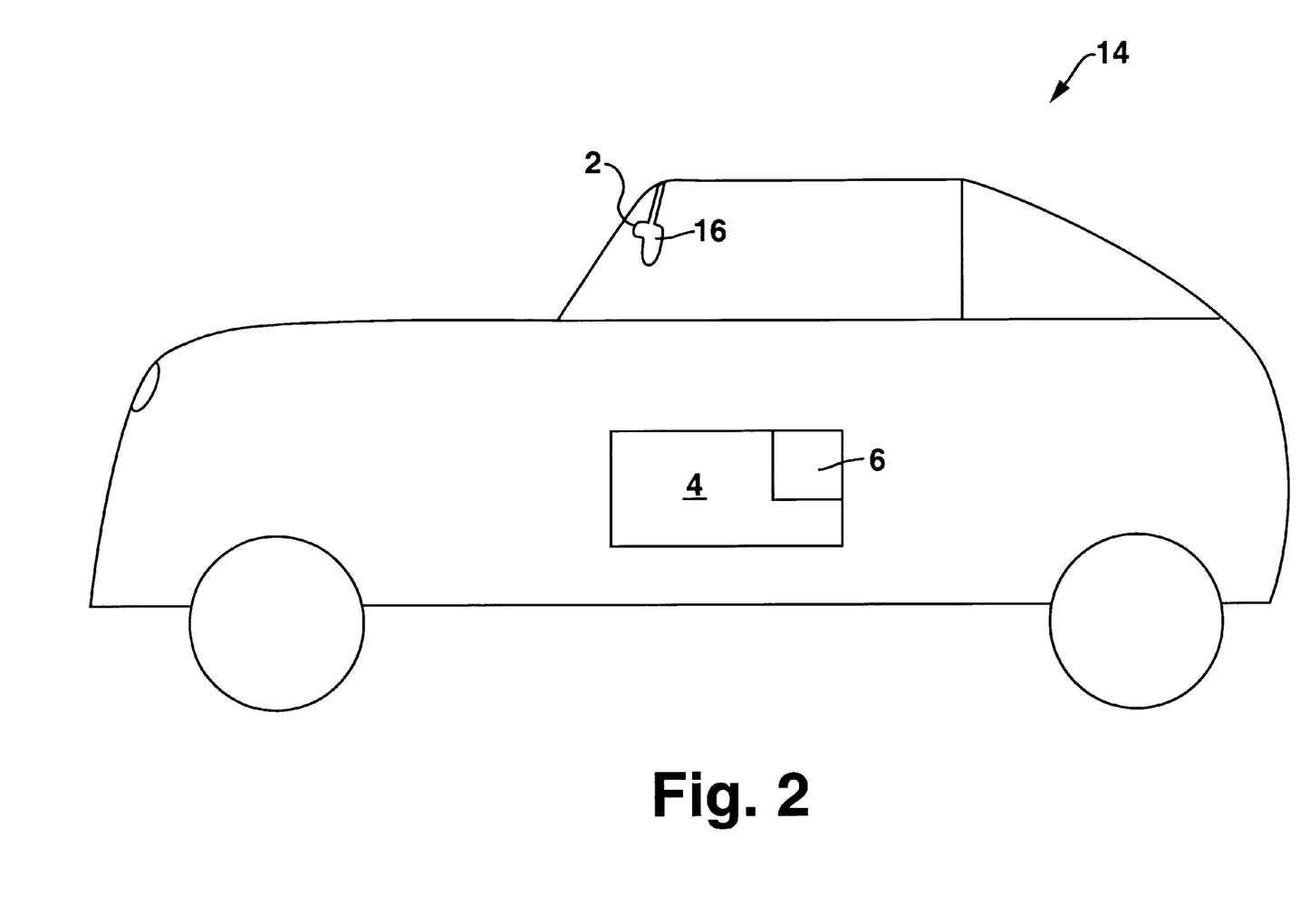

FIG. 2, shows in a schematic presentation, a first, simple embodiment of the invention in a personal motor vehicle 14. The camera 2 is in the interior of the personal motor vehicle 14 in the area of the inside rearview mirror 16 and is directed in the direction of travel. The image and data storage unit 4 with the control apparatus 6 is in an optional, protected location within the personal motor vehicle 14.

Figure 3:
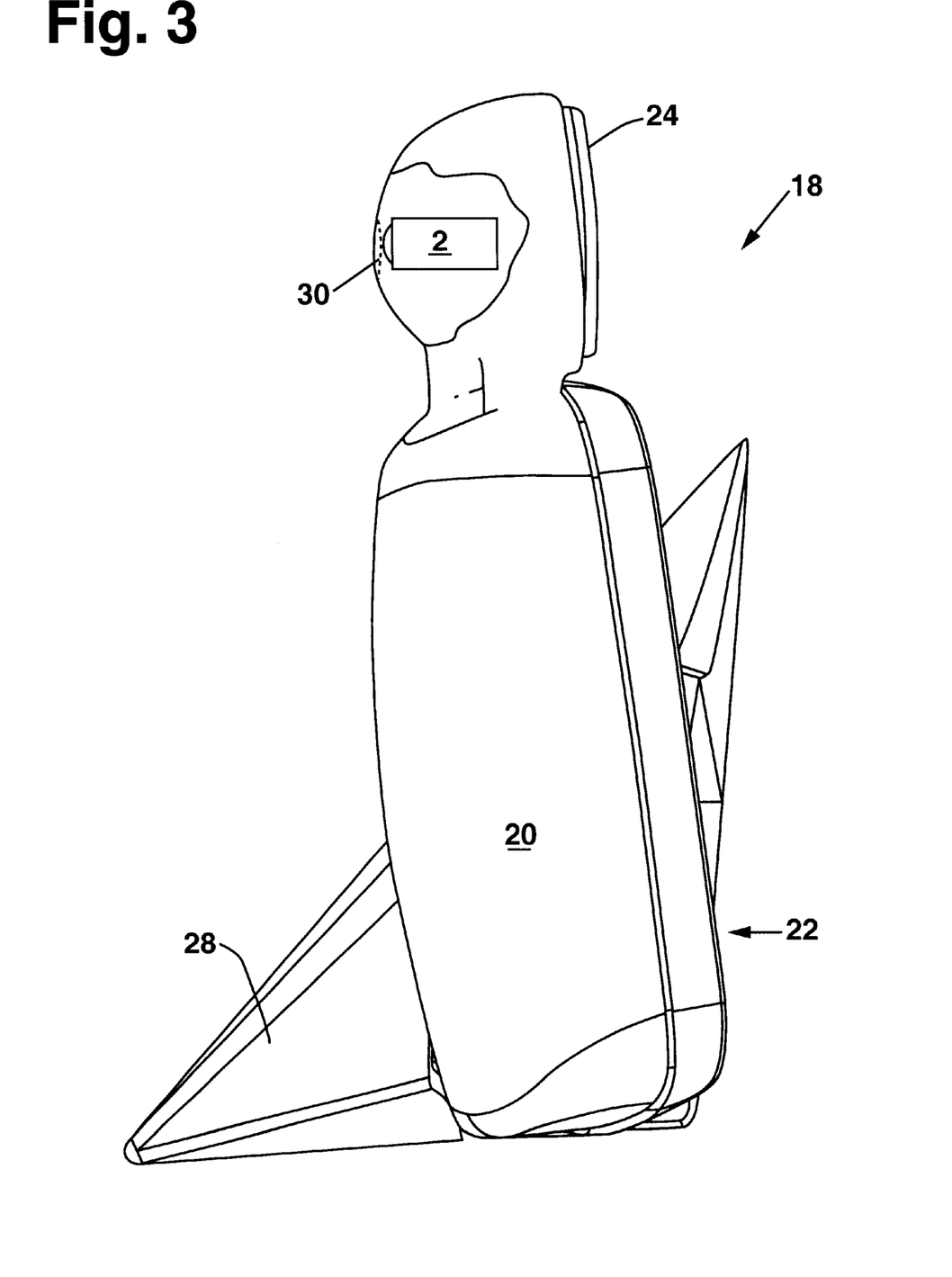
Figure 4:
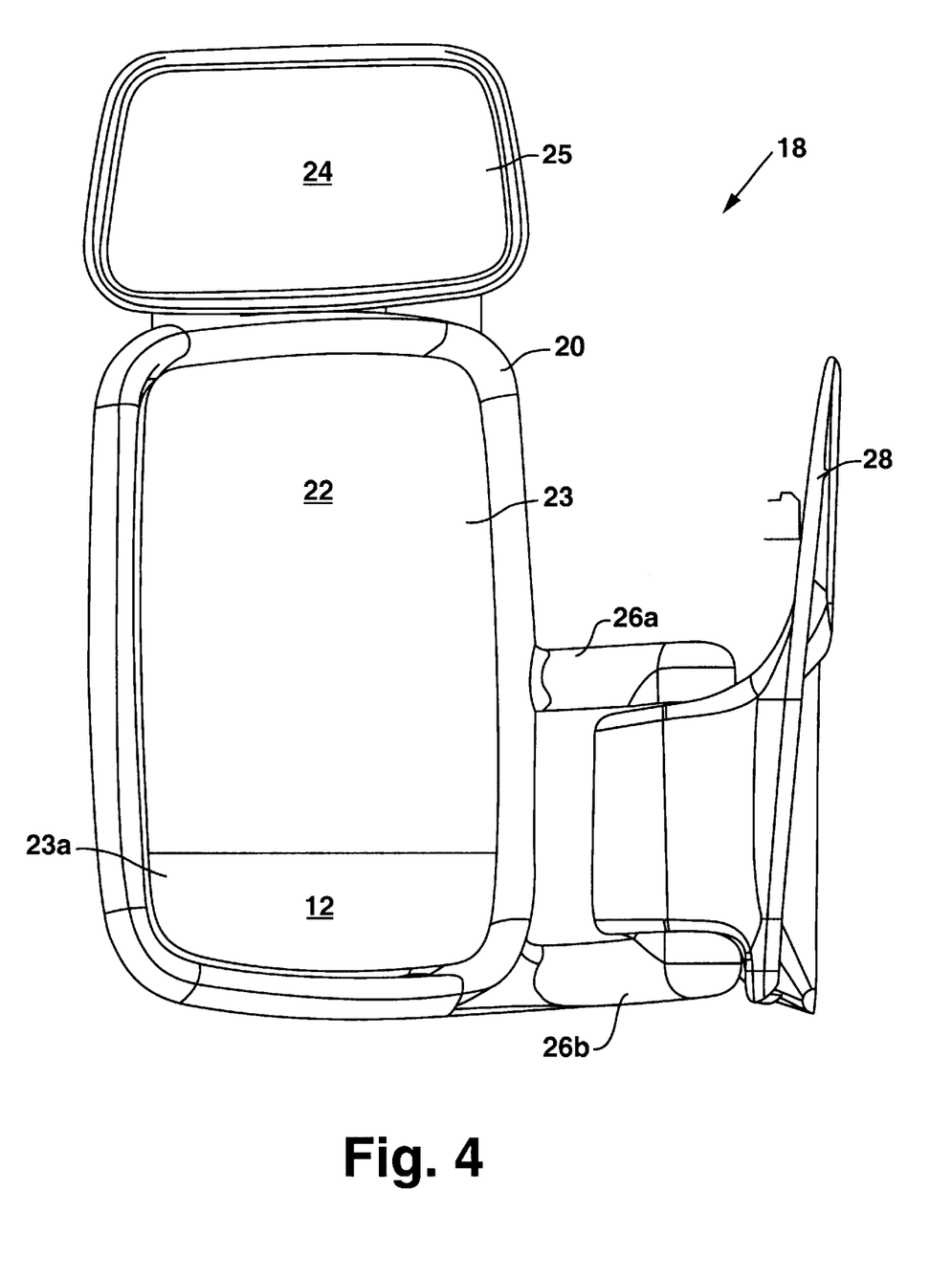

FIGS. 3, 4 illustrate the placement of a camera 2 and the monitor 12 in an outside rearview mirror 18 of a commercial vehicle, not further described. The outside rearview mirror 18 comprises a mirror housing 20 with an upper superimposed auxiliary mirror 24 with a mirror pane 25, a lower main mirror 22 which in turn has a mirror pane 23. The housing 20 of the double mirror 24, 22 is fastened to a mirror footing 28 by two holding arms 26a, 26b. The mirror footing 28 is affixed to the commercial vehicle (not shown). The camera 2 is placed behind the auxiliary mirror 24 in the interior of the mirror housing 20. An aperture 30 in the auxiliary mirror housing 20 allows the camera 2 a field of view in the direction of travel of the commercial vehicle. The image and data storage unit (not shown) is in an appropriate location within the commercial vehicle. The monitor 12 is, in this particular embodiment, in the first lower edge section 23a of the main mirror 22 where it is integrated into the mirror pane 23. Because of the placement of the monitor 12 in the mirror pane 23, the driver can see at one glance the area to the rear, which reflects in the main 22 and auxiliary mirrors 24, as well as the area in front of the commercial vehicle.

Figure 5:
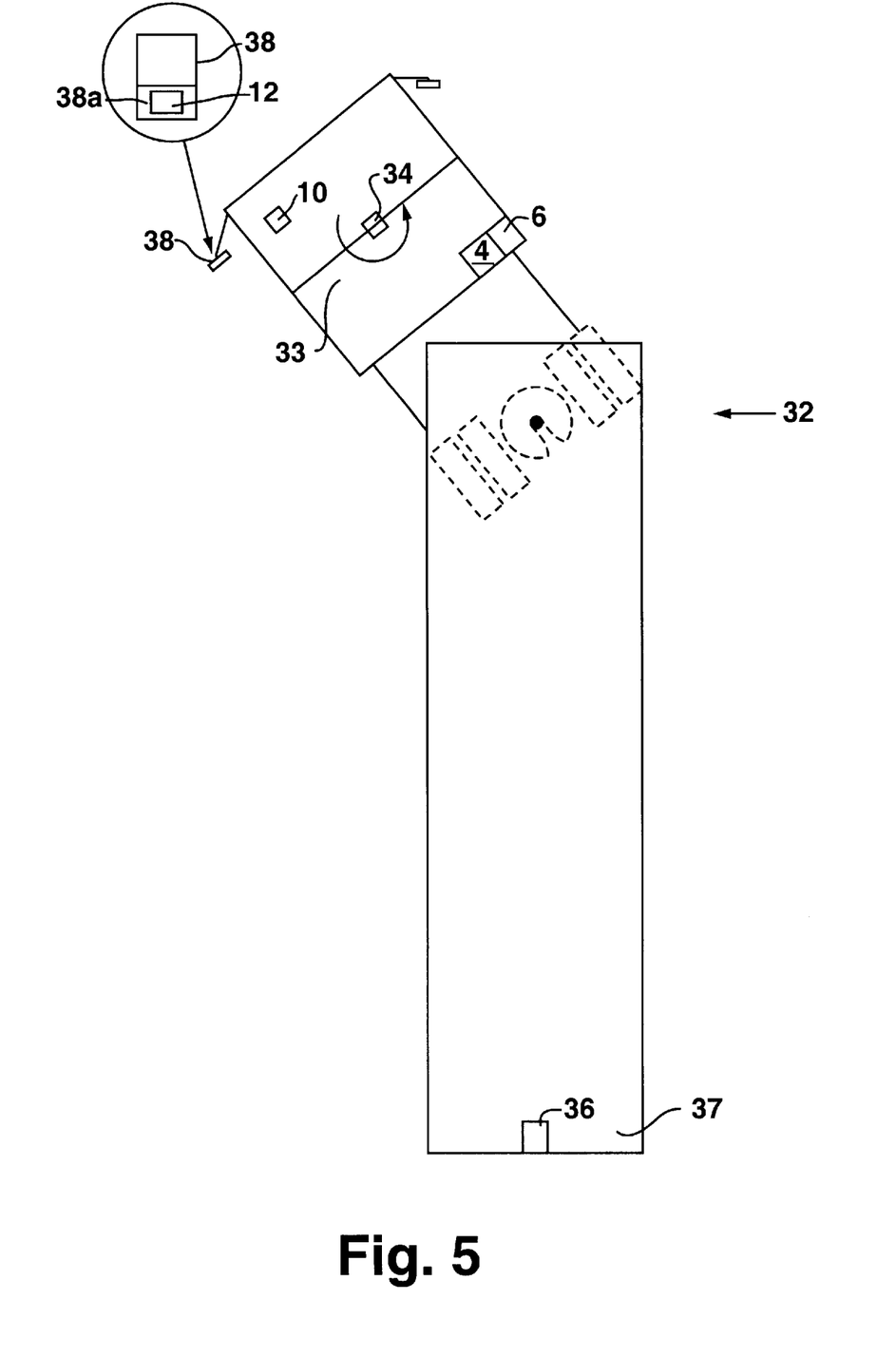

FIG. 5 shows a second embodiment of the invention in which in a tractor-trailer rig a forward camera 34 is pivotally mounted on the roof 33 of the tractor. A second, rearward looking camera 36 is in the rear area 37 of the trailer 32 and pointed to a rearview direction of travel. A monitor 12 is placed within an outer, left side rearview mirror 38 optionally in a second lower edge 38a. The monitor 12 is optionally connected with either the forward pivoting camera 34 or the rear camera 36 by means of connections through the operational device 10, which is within the reach of the driver. The pivoting camera 34 can be pivoted by the control apparatus 10 by which the angle of view of the forward camera 34 and the area viewed by the same can be changed.

Where backing up operations are necessary, by means of appropriate switching of the operational device 10, the view from the backward looking camera 36 can be made to appear on the monitor so that in the left outside rearview mirror 38, the field of view of the camera 36 disposed to the rear can be seen. If required, the driver can again, by means of the operational device 10, switch back to place the field of view of the forward camera 34 on the monitor 12.

The image and data storage unit 4 and the control apparatus 6 are again placed in an appropriate location in the tractor trailer unit. The control unit 6 ensures that the recording and the storage of the respective, most recent past is controlled so that both the images of the forward camera 34 as well as the image of the rear looking camera are stored.

The placement of the cameras 2, 34, 36 and the monitor 12 in the outside rearview mirror 18 or 34 is the object of German Patent Application 10 036 875.1, corresponding to U.S. patent application Ser. No. 09/731,574. Accordingly patent application 10 036 875.1 is incorporated herein.

It will be apparent to those skilled in the art that various modifications and variations can be made in the present invention without departing from the scope and spirit of the invention. It is intended that the present invention include such modifications and variations as come within the scope of the appended claims and their equivalents.

REFERENCE LIST

2 Camera
4 Image and data storage equipment
6 Control apparatus
8 Interface device
10 Operational device
12 Monitor
14 Passenger automobile
16 Inside rearview mirror
18 Outside rearview mirror
20 Mirror housing
22 Main mirror
23 Mirror pane for 22
24 Auxiliary Mirror 24
25 Mirror pane of 24
26 Holding arms
28 Footing of mirror
30 Camera opening in 20
32 Tractor-Trailer rig
34 Forward, pivoting camera
36 Rear, backward looking camera
38 Left side outside rearview mirror

What is claimed is:

1. A surveillance apparatus for a vehicle, the apparatus comprising:

an outside rearview mirror defining an aperture therethrough;

a camera having a field of regard with a plurality of fields of view from the vehicle, the camera disposed in the outside rearview mirror and adjustably configured to collect selected images from the plurality of fields of view through the aperture;

a storage apparatus in electrical communication with the camera, the storage apparatus configured to record and store the images collected by the camera for a period of time;

at least one sensor disposed about the vehicle and configured for sensing extra-vehicular information selected from the group consisting of temperature, humidity, date, time, pavement conditions, brightness and combinations thereof;

an interface device in communication with the at least one sensor and the storage apparatus and configured for providing the extra-vehicular information and vehicle drive train activity data to the storage apparatus; and a control apparatus in electronic communication with the camera and the storage apparatus, the control apparatus configured to activate the camera and storage apparatus and adjust the field of regard of the camera to record the selected images from the plurality of fields of view.

2. The surveillance apparatus of claim 1, wherein the camera is a still image camera.

3. The surveillance apparatus of claim 1, wherein the camera is a video camera.

4. The surveillance apparatus of claim 1, wherein the period of time is between a first point in past time $t_1$ and a second point in time $t_2$.

5. The surveillance apparatus of claim 4, wherein the storage apparatus is an image and data storage apparatus.

6. The surveillance apparatus of claim 4, wherein the storage apparatus erases the data older than $t_1$.

7. The surveillance apparatus of claim 1, wherein the vehicle drive train activity data is selected from the group consisting essentially of vehicle speed, acceleration, brake usage, gear selection and combinations thereof.

8. The surveillance apparatus of claim 1, wherein the storage apparatus is configured to be impact resistant and fireproof.

9. The surveillance apparatus of claim 1, wherein the camera is disposed proximate an inside rearview mirror in the vehicle.

10. The surveillance apparatus of claim 1, wherein the camera is configured to be weatherproof.

11. The surveillance apparatus of claim 1, wherein the camera is configured to be swivelled.

12. The surveillance apparatus of claim 1, further comprising a monitor to display the images.

13. The surveillance apparatus of claim 12, wherein the monitor is disposed in a vehicle driver's field of view.

14. The surveillance apparatus of claim 13, wherein the monitor is disposed in an edge of a mirror pane.

15. The surveillance apparatus of claim 1, further comprising a plurality of cameras disposed about the vehicle to collect different images.

16. The surveillance apparatus of claim 1, further comprising a plurality of monitors to display different images.

17. The surveillance apparatus of claim 1, wherein at least one monitor can simultaneously display a plurality of images.

18. The surveillance apparatus of claim 1, further comprising an operational device proximate a driver area, the operational device configured to affect the control apparatus to pivot the camera to change the field of regard.

19. The surveillance apparatus of claim 1, wherein at least one of the plurality of the fields of view from the vehicle is forward looking.

20. The surveillance apparatus of claim 1, wherein at least one of the plurality of the fields of view from the vehicle is rearward looking.

21. The surveillance apparatus of claim 1, wherein at least one of the plurality of the fields of view from the vehicle is lateral looking.

22. A method of surveilling a vehicle operating area with a surveillance apparatus attached to the vehicle and including a camera mounted in a rearview mirror, and a storage apparatus in electronic communication with the camera and configured to record and store vehicle data, the method comprising:

(a) selectively adjusting the camera to collect selected images from a plurality of fields of view through an aperture in the rearview mirror, the camera having a field of regard with a plurality of fields of view from the aperture;

(b) collecting the images using the camera;

(c) transferring the collected images to the storage apparatus; and (d) storing the collected images in the storage apparatus between a first point in past time $t_1$ and a second point in time $t_2$; and (e) and erasing data older than $t_1$.

23. The method of claim 22, wherein the surveillance apparatus includes an interface device for collecting data, and the method further includes the steps of transferring collected data from the interface device to the storage apparatus and storing the collected data in the storage apparatus for at least a given period of time.

24. The method of claim 23, wherein the collected data includes at least one of vehicular data and environmental data.

25. The method of claim 22, wherein the surveillance apparatus includes a monitor, and the method further includes the step of displaying the collected images on the monitor.

26. The method of claim 22, wherein the camera includes a plurality of cameras mounted at different locations on the vehicle.

27. A surveillance apparatus for a vehicle, the apparatus comprising:

an outside rearview mirror defining an aperture therethrough;

a camera disposed in the outside rearview mirror having a field of regard through the aperture with a plurality of fields of view, the camera adjustably configured to collect selected images from the plurality of the fields of view;

a storage apparatus in electrical communication with the camera, the storage apparatus configured to record and store the images collected by the camera for a period of time between a point in past time $t_1$ to a point in time $t_2$ and further configured to erase the images older than $t_1$;

at least one sensor disposed about the vehicle and configured for sensing extra-vehicular information selected from the group consisting of temperature, humidity, date, time, pavement conditions, brightness and combinations thereof;

an interface device in communication with the at least one sensor and the storage apparatus and configured for providing the extra-vehicular information and vehicle drive train activity data to the storage apparatus, the vehicle drive train activity selected from the group consisting of vehicle speed, acceleration, brake usage, gear selection and combinations thereof; and a control apparatus in electronic communication with the camera and the storage apparatus, the control apparatus configured to activate the camera and storage apparatus and adjust the field of regard of the camera to record the selected images from the plurality of fields of view.

28. The surveillance apparatus of claim 27, further comprising a plurality of cameras disposed about the vehicle.

29. The surveillance apparatus of claim 27, further comprising a monitor to display the selected images.

* * * * *